United States Patent
Shekleton

Patent Number: 5,113,647
Date of Patent: May 19, 1992

[54] GAS TURBINE ANNULAR COMBUSTOR

[75] Inventor: Jack R. Shekleton, San Diego, Calif.

[73] Assignee: Sundstrand Corporation, Rockford, Ill.

[21] Appl. No.: 455,588

[22] Filed: Dec. 22, 1989

[51] Int. Cl.⁵ .............................. F02C 7/22; F02C 3/04
[52] U.S. Cl. ...................................... 60/39.36; 60/738; 60/739; 60/743; 60/755
[58] Field of Search ................... 60/39.36, 752, 759, 60/760, 738, 737, 739, 743, 755, 756, 758, 39.75, 39.83

[56] References Cited

U.S. PATENT DOCUMENTS

| | | | |
|---|---|---|---|
| 3,383,855 | 5/1968 | Freeman et al. | 60/760 |
| 3,613,360 | 10/1971 | Howes | 60/39.36 |
| 3,671,171 | 6/1972 | Doyle | 60/760 |
| 3,869,864 | 3/1975 | Bunn | 60/39.36 |
| 4,018,043 | 4/1977 | Clemmens | 60/756 |
| 4,151,709 | 5/1979 | Melconian et al. | 60/39.36 |
| 4,216,651 | 8/1980 | Ormerod | |
| 4,301,657 | 11/1981 | Penny | 60/750 |
| 4,549,402 | 10/1985 | Saintsbury et al. | 60/759 |
| 4,794,754 | 1/1989 | Shekelton et al. | 60/760 |
| 4,926,630 | 5/1990 | Shekleton | 60/39.36 |

Primary Examiner—Richard A. Bertsch
Assistant Examiner—Timothy S. Thorpe
Attorney, Agent, or Firm—Wood, Phillips, Mason, Reckenwald & Van Santen

[57] ABSTRACT

The expense of fabricating an annular combustor (10) for a gas turbine is minimized by providing a combustor housing (12) including an axially extending sleeve (14) and an annular liner (18) disposed within the housing (12) and about the sleeve (14). The annular liner (18) has concentric inner and outer axially elongated walls (20, 22) spaced from the sleeve (14) and the housing (12), respectively, and also has a radially extending wall (24) spaced from the housing (12) and interconnecting the inner and outer walls (20, 22) at one end to define a combustion chamber (26). The liner (18) to spaced from the housing (12) the sleeve (14) to define a compressed air flow path (28) extending from a radially outer compressed air inlet (30) to a radially inner compressed air outlet (32) in communication with the combustion chamber (26) axially remote from the radially extending wall (24). The annular combustor (26) is provided with a plurality of fuel injectors (36, 40) for injecting a liquid fuel to be burned into the liner (18) in a generally tangential direction adjacent the radially extending wall (24) to impact liquid fuel directly onto an inner surface (22a) of the outer wall (22) adjacent to the radially extending wall (24). The annular combustor (26) also includes a plurality of open ended elongated tubes (34) in the outer wall (22) intermediate the compressed air inlet (30) and the radially extending wall (24) to direct air for combustion into the combustion chamber (26). With this arrangement, a mixture of fuel and air may be ignited within the combustion chamber (26) and the resulting hot gases of combustion utilized to drive the gas turbine.

15 Claims, 2 Drawing Sheets

GAS TURBINE ANNULAR COMBUSTOR

FIELD OF THE INVENTION

The present invention is directed to an annular combustor for a gas turbine and, more particularly, to an annular combustor which may be manufactured inexpensively.

BACKGROUND OF THE INVENTION

Most relatively small missiles in use today are propelled by solid fuel rockets as opposed to, for example, turbojet engines The selection of a solid fuel rocket as a propulsion device has been largely dictated by two factors. First, in many instances, a turbine engine cannot be fabricated sufficiently economically as to compete with a solid fuel rocket engine. Secondly, in small size missiles, i.e., those having relatively small diameter on the order of about six inches, it has heretofore been quite difficult to manufacture an efficient turbojet engine. The difficulty lies in the fact that the turbine jet engine must fit within the six inch envelope required of the propulsion unit for such a missile. Unfortunately, the use of solid fuel rocket engines has had consequences that are not desirable in many applications.

Specifically, the use of solid fuel rocket engines results in the loss of some degree of control of the missile flight path or trajectory. In contrast, control is far greater with gas turbine engines whose output can readily be varied. Further, even if the gas turbine engine operates relatively inefficiently, the use of such an engine would greatly extend the range of the missile.

The difficulty in economically producing small diameter gas turbine engines resides primarily in the labor intensive nature of the manufacture of the combustor. Furthermore, as combustor sizes shrink to fit within some desired envelope, the difficulty in achieving efficient combustion of fuel rises significantly In particular, as the size or volume of a combustor is reduced, there may be insufficient volume to allow the fuel to first be vaporized completely, burned efficiently, and then mixed uniformly.

In order to overcome the foregoing, a unique low cost annular combustor was developed as disclosed in commonly owned U.S. Pat. No. 4,794,754, issued Jan. 3, 1989. This annular combustor has proven to be well suited for its intended purpose, but it was desired to attempt to achieve greater thrust with a higher turbine inlet temperature while meeting the necessary size constraints and achieving the goal of ultralow cost for throw away missile applications. For this purpose, it was recognized that a new approach would be required to reach the necessary parameters of operation.

More specifically, the small missile application may typically be such as to require a spacing of one inch between combustor walls. It is also typically a necessary parameter that very difficult to burn missile fuel such as JP10 be handled efficiently even though such fuel is known to have a high carbon content together with very high surface tension and viscosity which, respectively, results in carbon buildup on the walls of the combustor together with a smoke filled exhaust and makes fuel atomization difficult which creates combustion inefficiency and flame instability problems. In very small combustors, such problems are oftentimes greatly magnified particularly where only low cost solutions are available.

In addition, such problems are exacerbated where high turbine inlet temperatures are to be found. This follows because only low cost means of cooling the metal at such high temperatures are acceptable especially for small missile applications. In addition, the turbine inlet temperature distribution must be exceptionally uniform to avoid burnout of the turbine nozzle blades.

The present invention is directed to overcoming one or more of the foregoing problems and achieving the resulting objects.

SUMMARY OF THE INVENTION

It is the principal object of the present invention to provide a new and improved annular combustor for a gas turbine wherein the annular combustor is characterized by meeting necessary performance parameters while utilizing an inexpensive construction. Still further, it is an object of the present invention to provide a new and improved annular combustor of unusually small volume which promotes both full and efficient vaporization and combustion of fuel along with thorough mixing for uniform exit temperatures to a turbine wheel.

In an exemplary embodiment of an annular combustor for a gas turbine in accordance with the present invention, the combustor comprises a combustor housing including an axially extending sleeve and an annular liner disposed within the housing and about the sleeve. The liner has concentric inner and outer axially elongated walls spaced from the sleeve and the housing, respectively, and also has a radially extending wall spaced from the housing and interconnecting the inner and outer walls at one end to define a combustion chamber. The liner is spaced from the housing and the sleeve to define a compressed air flow path extending from a radially outer compressed air inlet in communication with a source of compressed air to a radially inner compressed air outlet in communication with the combustion chamber at a point axially remote from the radially extending wall. The combustor also includes means for injecting a liquid fuel to be burned into the liner in a generally tangential direction adjacent the radially extending wall to impact liquid fuel directly onto an inner surface of the outer wall adjacent to the radially extending wall. The combustor still further includes a plurality of open ended elongated tubes in the outer wall intermediate the compressed air inlet and the radially extending wall in a plane transverse to the axis of the combustor such that the tubes communicate with the compressed air flow path to direct air for combustion into the combustion chamber. With this arrangement, means are provided for igniting a mixture of fuel and air within the combustion chamber with the resulting hot gases of combustion being used to drive the gas turbine.

In a preferred embodiment, the fuel injecting means includes a fuel manifold having a plurality of circumferentially spaced fuel dispensing openings. The fuel manifold is advantageously disposed in a plane transverse to the axis between the housing and the outer wall of the liner and is in communication with a source of liquid fuel. In addition, the fuel injecting means preferably includes a plurality of open ended elongated tubes in the outer wall adjacent the fuel manifold in a direction generally tangential to the combustion chamber in closely spaced parallel relation to the fuel manifold.

In the preferred embodiment, the tubes intermediate the compressed air inlet and the radially extending wall are also directed generally tangential to the combustion chamber. The tubes advantageously extend through the outer wall with each of the tubes being directed at generally the same angle as the tubes adjacent the fuel manifold to produce swirl within the combustion chamber and whereby combustion air from the tubes centrifuges liquid fuel onto the inner surface of the outer wall. With this arrangement, liquid fuel enters the combustion chamber through the fuel manifold and adjacent tubes following which the combustion air causes an at least partially stabilized stratification of an inner cold air layer, a hot flame layer, a gaseous fuel layer and an outer liquid fuel layer.

In a highly preferred embodiment, a plurality of open ended tubes extend through the outer wall adjacent the compressed air inlet. The tubes are advantageously directed toward a combustor outlet at the end of the combustion chamber remote from the radially extending wall to provide dilution air at a point upstream of a turbine nozzle. In addition, the compressed air outlet is advantageously in communication with the combustion chamber adjacent a turbine shroud. The turbine shroud and the outer wall together define a combustor outlet leading to the turbine nozzle. With this arrangement, the compressed air outlet directs compressed air onto the turbine shroud upstream of the combustor outlet and turbine nozzle.

Other objects, advantages and features of the present invention will become apparent from a consideration of the following specification taken in conjunction with the accompanying drawings.

DETAILED DESCRIPTION OF THE PREFERRED EMBODIMENT

Figure 1:
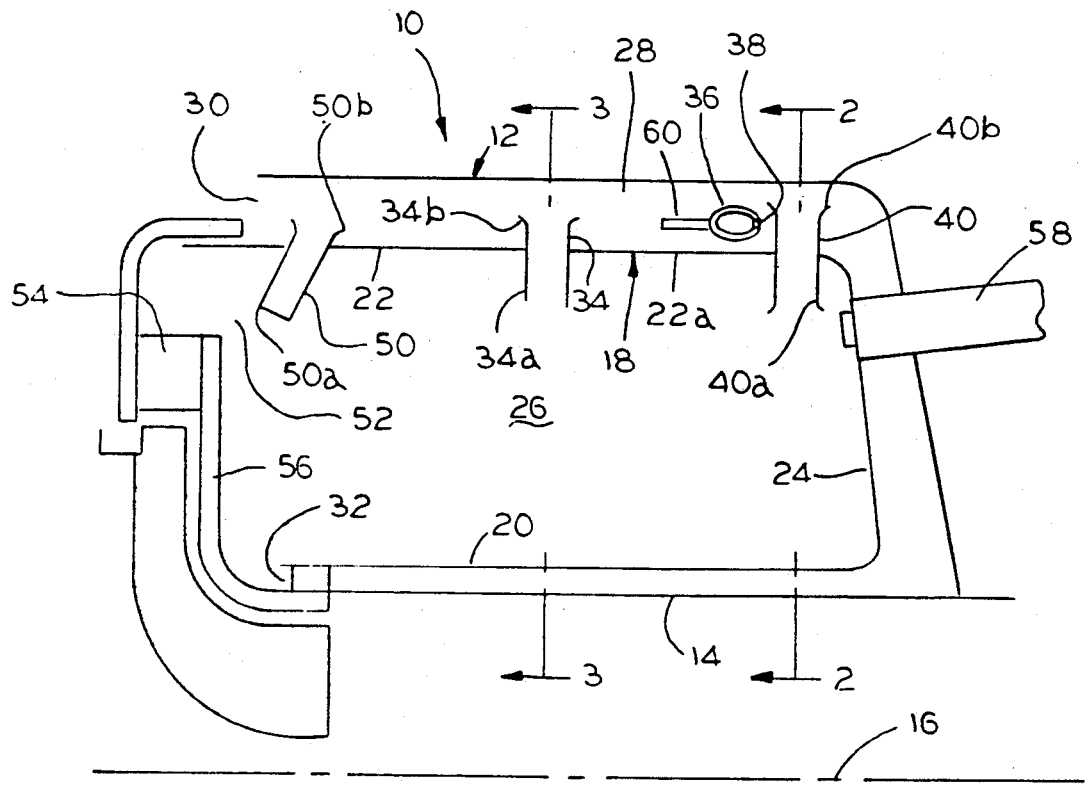
FIG. 1 is a cross sectional view of an annular combustor for a gas turbine in accordance with the present invention.

Referring to the drawings, and first to FIG. 1, the reference numeral 10 designates generally an annular combustor for a gas turbine in accordance with the present invention. The combustor 10 comprises a combustor housing 12 including an axially extending sleeve 14 having an axis 16 and an annular liner generally designated 18 disposed within the housing 12 and about the sleeve 14. The liner 18 has concentric inner and outer axially elongated walls 20 and 22 spaced from the sleeve 14 and housing 12, respectively, and also has a radially extending wall 24 spaced from the housing 12 and interconnecting the inner and outer walls 20 and 22 at one end to define a combustion chamber 26. The liner 18 is spaced from the housing 12 and the sleeve 14 to define a compressed air flow path 28 extending from a radially outer compressed air inlet 30 in communication with a source of compressed air to a radially inner compressed air outlet 32 in communication with the combustion chamber 26 at a point axially remote from the radially extending wall 24. The combustor 10 also includes means for injecting a liquid fuel to be burned into the liner 18 in a generally tangential direction adjacent the radially extending wall 24 to impact liquid fuel directly onto an inner surface 22a of the outer wall 22 adjacent to the radially extending wall 24. With this construction, the combustor 10 further includes a plurality of open ended elongated tubes 34 in the outer wall 22 intermediate the compressed air inlet 30 and the radially extending wall 24.

Figure 3:
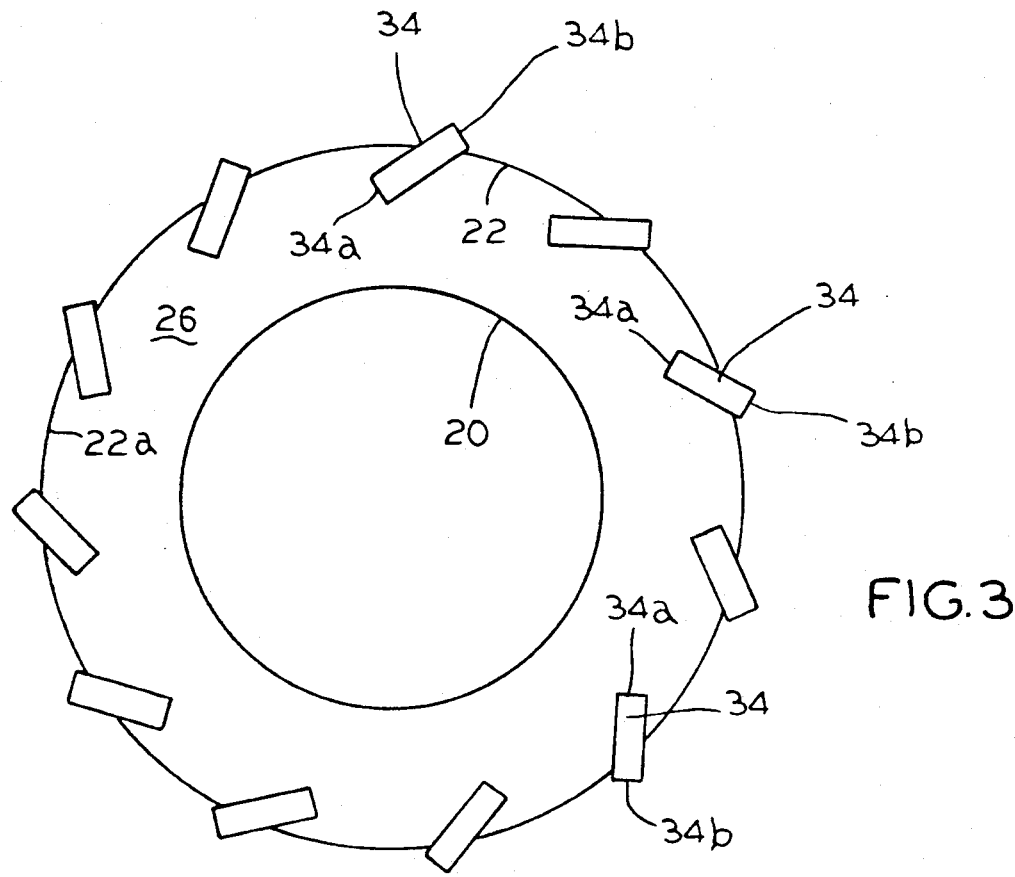
FIG. 3 is a cross sectional view taken on the line 3—3 of FIG. 1.

Referring to FIGS. 1 and 3, the tubes 34 are disposed in a plane transverse to the axis 16 and are in communication with the compressed air flow path 28 to direct air for combustion into the combustion chamber 26. It will be seen that the tubes 34 are directed generally tangential to the combustion chamber 26 (FIG. 3) and extend through the outer wall 22. As will be described in greater detail hereinafter, the combustion air from the tubes 34 assists in centrifuging liquid fuel onto the inner surface 22a of the outer wall 22 in a highly unique manner.

Figure 2:
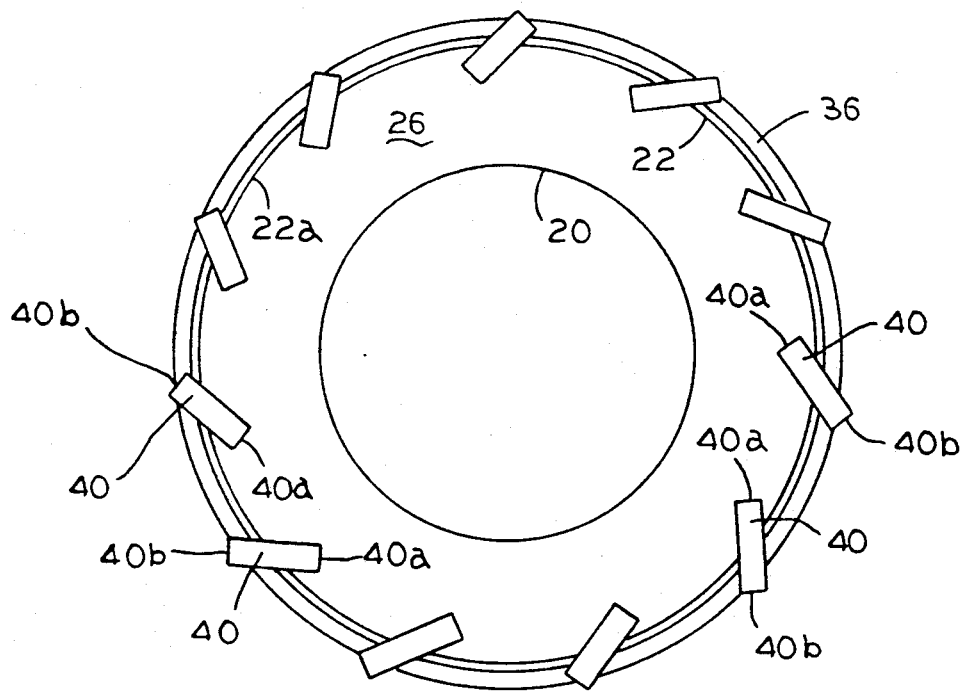
FIG. 2 is a cross sectional view taken on the line 2—2 of FIG. 1.

Referring to FIGS. 1 and 2, the means for injecting a liquid fuel to be burned into the liner 18 includes a fuel manifold 36. The fuel manifold 36 is disposed in a plane transverse to the axis 16 and includes a plurality of circumferentially spaced fuel dispensing openings 38. Moreover, the fuel manifold 36 is disposed between the housing 12 and the outer wall 22 of the liner 18 in communication with a source of liquid fuel.

Still referring to FIGS. 1 and 2, the means for injecting a liquid fuel to be burned into the liner 18 also includes a plurality of open ended elongated tubes 40. The tubes 40 are disposed in the outer wall 22 adjacent the fuel manifold 36 and adjacent the radially extending wall 24. As shown, the tubes 40 are also disposed in a plane transverse to the axis 16 in closely spaced parallel relation to the plane of the fuel manifold 36.

As best shown by comparing FIGS. 2 and 3, the tubes 34 and 40 are each directed generally tangential to the combustion chamber 26. Each of the tubes 34 is directed at generally the same angle as the tubes 40 adjacent the fuel manifold 36 to produce swirl within the combustion chamber 26. In this manner, liquid fuel is centrifuged onto the inner surface 22a of the outer wall 22 and the combustion air causes an at least partially stabilized stratification of an inner cold air layer 42, a hot flame layer 44, a gaseous fuel layer 46 and an outer liquid fuel layer 48 (see FIG. 4).

Figure 4:
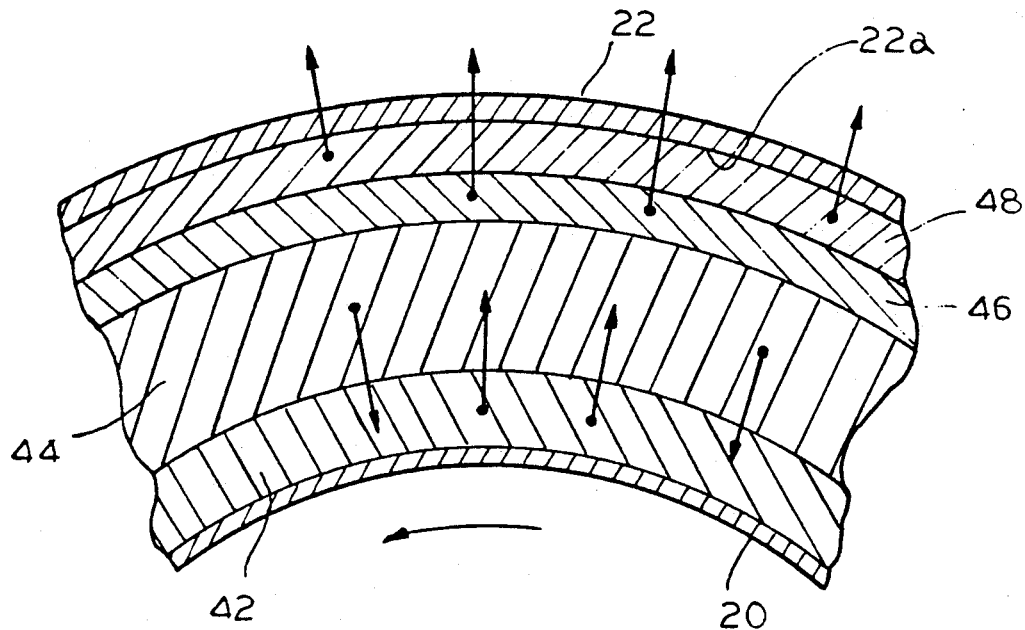
FIG. 4 is a schematic cross sectional view illustrating stratification within the annular combustor in accordance with the present invention.

More specifically, the gaseous fuel layer 46 and the outer liquid fuel layer 48 are stably stratified due to their relative weight. The inner cold air layer 42 and the hot flame layer 44 are not stably stratified. In this connection, the inner cold air layer 42 rushes outward while the hot flame layer 44 rushes inward as shown in FIG. 4.

Referring specifically to FIG. 1, the combustor 10 also advantageously includes a plurality of open ended elongated tubes 50 extending through the outer wall 22 adjacent the compressed air inlet 30. The tubes 50 are directed toward a combustor outlet 52 at the end of the combustion chamber 26 remote from the radially extending wall 24 to provide dilution air at a point upstream of a turbine nozzle 54. It will also be seen that there is a turbine shroud 56 adjacent to the compressed air outlet 32. The turbine shroud 56 and the outer wall 22 together define the combustor outlet 52 leading to the turbine nozzle 54. As will be appreciated, the compressed air outlet 32 directs compressed air into the combustion chamber 26 and, more specifically, onto the turbine shroud 56 upstream of the combustor outlet 52 and the turbine nozzle 54.

Referring once again to FIG. 1, the combustor 10 includes means for igniting a mixture of fuel and air within the combustion chamber 26. This means may comprise an igniter or squib 58 which may extend through the radially extending wall 24 where it is in close proximity to the tubes 40 which deliver air and fuel into the combustion chamber 26. As for the exact location of the igniter or squib 58, this is a matter within the ability of skilled combustor designers.

As will be appreciated from FIG. 1, the combustor housing 12 is generally bell-shaped and the fuel manifold 36 is disposed in a first plane transverse to the axis 16 of the bell-shaped combustor housing 12 and the axially extending sleeve 14. The tubes 40 are disposed in a second plane transverse to the axis 16 in closely spaced parallel relation to the plane of the fuel manifold 36. Also, it will be seen that the tubes 34 are disposed in a third plane transverse to the axis 16 in spaced apart but parallel relation to the first and second planes, i.e., the planes of the fuel manifold 36 and the tubes 40.

As for the tubes 40, each has one end 40a located within the combustion chamber 26 and the other end 40b disposed between the outer wall 22 and the housing 12. The one end 40a of each of the tubes 40 is disposed closely adjacent the radially extending wall 24 and the other end 40b of each of the tubes 40 is in communication with the compressed air flow path 28. Additionally, each of the tubes 40 is in communication with one of the fuel dispensing openings 38 in the fuel manifold 36 to receive fuel therefrom.

For purposes of understanding the fuel injection arrangement, the teachings of commonly owned U.S. Pat. No. 4,794,754, issued Jan. 3, 1989 is hereby incorporated by reference. It will be appreciated that the fuel dispensing openings 38 are aligned with suitable corresponding openings in the side walls of the tubes 40 for purposes of directing fuel thereinto which interacts with compressed air entering the end 40b of the tubes 40 and flowing out the end 40a into the combustion chamber 26. With this arrangement, the tubes 40 are positioned to impact liquid fuel directly onto the inner surface 22a of the outer wall 22 adjacent the radially extending wall 24.

As will also be appreciated, each of the tubes 34 has one end 34a located within the combustion chamber 26. It will further be seen from FIGS. 1 and 3 that each of the tubes 34 has the other end 34b disposed between the outer wall 22 and the housing 12, i.e., in communication with the compressed air flow path 28. By means of this construction, the tubes 34 are well suited to direct air for combustion into the combustion chamber 26.

Referring specifically to FIG. 1, the tubes 50 each one end 50a located within the combustion chamber 26 and they each have the other end 50b disposed between the outer wall 22 and the housing 12. Compressed air in the compressed air flow path 28 is caused to be injected through these tubes at the combustor outlet 52 to provide dilution air at a point upstream of the turbine nozzle 54.

With this understanding of the invention, it is believed unique for the fuel manifold 36 and the tubes 40 to be positioned in the outer wall 22 adjacent the radially extending wall 24 in side-by-side relation. Thus, as shown, the tubes 40 in the outer wall 22 are positioned axially closer to the radially extending wall 24 than the fuel manifold 36. In the illustrated embodiment, a fuel line 60 extends from a liquid fuel source to the fuel manifold 36 between the housing 12 and the outer wall 22 within the compressed air flow path 28.

With the present invention, fuel evaporation is accelerated by means of the unique stratification previously discussed. Thus, the problem of insufficient time for evaporation in a combustor of short length is entirely resolved as well as the usual attendant carbon/smoke problems. In addition, this is all achieved while utilizing an inexpensive fuel injection technique even with difficult to burn JP10 fuel.

In this connection, the high tangential swirl of the combustion air creates very high "G" forces on the fuel droplets that are injected through the tubes 40. This causes the fuel droplets to be centrifuged onto the inside surface 22a of the outer wall 22 while small fuel droplets are rapidly evaporated and form the nucleus of the initial blue flame. As for the large fuel droplets, they spread out as a thin liquid fuel film as they impact the outer wall 22.

As a thin liquid fuel film, evaporation is greatly accelerated. This occurs because there is always maintained a high relative velocity between the slow moving liquid fuel film and the radially inwardly located hot, fast initial flame. For this reason, very fast, smokeless, carbon-free fuel evaporation is achieved.

In addition to accelerating evaporation, fuel/air mixing is also accelerated since the heavy liquid fuel constrained by "G" forces necessarily is on the outer wall 22 and the somewhat less heavy evaporated gaseous fuel lies adjacent to the liquid fuel. In addition, the much less heavy hot flame moves radially inward under "G" force effects while the heavier cold air moves radially outward under "G" force effects. With this interaction between the stratified layers, ignition of fuel and air is achieved which causes the combusted fuel/air mixture to move radially inward following which the whole cycle continuously repeats until all fuel is burned.

Hence, by use of high "G" forces it has been possible to accelerate mixing. This is particularly advantageous in applications involving relatively small combustors. In addition, it has been possible to accelerate the evaporation and subsequent mixing of fuel.

The result is a smokeless blue efficient stable short flame, and it is thus possible to operate the combustor without carbon buildup and totally free of exhaust smoke in an extremely small volume. Moreover, as will be appreciated from the foregoing, the combustor is a simple, inexpensive and lightweight configuration capable of burning even difficult to burn fuels such as JP10.

With the present invention, the low radiation of the blue flame has numerous advantageous including the fact that it is possible to operate the combustor while keeping the radially extending wall or dome 24 cool without use of film cooling air. Likewise, it will be appreciated from the foregoing that the absence of a film of air on the outer wall 22 is vital in order to be able to achieve the objectives of accelerated fuel evaporation and fast flame propagation mentioned hereinabove.

If a film of air is present on the outer wall 22, this will significantly slow evaporation and impede ignition. The fuel then solely evaporates and forms carbon and, in conventional combustors, the film of air may serve as a means of flame quench and it will most definitely take up combustor volume. Hence, the available volume for combustion is much reduced without removal of the film of air which is unacceptable in many small combustors.

While in the foregoing there has been set forth a preferred embodiment of the invention, it will be appreciated that the details herein given may be varied by those skilled in the art without departing from the true spirit and scope of the appended claims.

I claim:

1. An annular combustor for a gas turbine, comprising:

a combustor housing including an axially extending sleeve having an axis;

an annular liner disposed within said housing and about said sleeve and having concentric inner and outer axially elongated walls, said inner and outer walls of said liner being spaced from said sleeve and said housing, respectively, said liner also having a radially extending wall spaced from said housing and interconnecting said inner and outer walls at one end to define a combustion chamber;

said liner being spaced from said housing and said sleeve to define a compressed air flow path, said compressed air flow path extending rom a radially outer compressed air inlet in communication with a source of compressed air to a radially inner compressed air outlet in communication with said combustion chamber, said compressed air outlet being axially remote from said radially extending wall;

means for injecting a liquid fuel to be burned into said liner in a generally tangential direction adjacent said radially extending wall to impact liquid fuel directly onto an inner surface of said outer wall adjacent thereto;

means for centrifuging liquid fuel onto said inner surface of said outer wall to cause an at least partially stabilized stratification of an inner cold air layer, a hot flame layer, a gaseous fuel layer and an outer liquid fuel layer; and means for igniting a mixture of fuel and air within said combustion chamber.

2. The annular combustor of claim 1 wherein said fuel centrifuging means includes a plurality of open ended elongated tubes in said outer wall intermediate said compressed air inlet and said radially extending wall, said tubes being disposed in a plane transverse to said axis and communicating with said compressed air flow path to direct air for combustion into said combustion chamber.

3. The annular combustor of claim 2 wherein said fuel injecting means includes a fuel manifold having a plurality of circumferentially spaced fuel dispensing openings, said fuel manifold being disposed in a plane transverse to said axis, said fuel manifold being disposed between said housing and said outer wall of said liner and being in communication with a source of liquid fuel.

4. The annular combustor of claim 3 wherein said fuel injecting means further includes a plurality of open ended elongated tubes in said outer wall adjacent said fuel manifold, said tubes being directed generally tangential to said combustion chamber, said tubes being disposed in a plane transverse to said axis in closely spaced parallel relation to said plane of said fuel manifold.

5. The annular combustor of claim 4 wherein said tubes intermediate said compressed air inlet and said radially extending wall are directed generally tangential to said combustion chamber, said tubes extending through said outer wall, each of said tubes being directed at generally the same angle as said tubes adjacent said fuel manifold to produce swirl within said combustion chamber.

6. The annular combustor of claim 2 including a plurality of open ended elongated tubes extending through said outer wall adjacent said compressed air inlet, said tubes being directed toward a combustor outlet at the end of said combustion chamber remote from said radially extending wall, said tubes being adapted to provide dilution air at a point upstream of a turbine nozzle.

7. The annular combustor of claim 2 wherein said compressed air outlet is in communication with said combustion chamber adjacent a turbine shroud, said turbine shroud and said outer wall together defining a combustor outlet leading to a turbine nozzle, said compressed air outlet directing compressed air onto said turbine shroud upstream of said combustor outlet and turbine nozzle.

8. An annular combustor for a gas turbine, comprising:

a combustor housing including an axially extending sleeve having an axis;

an annular liner disposed within said housing and about said sleeve and having concentric inner and outer axially elongated walls, said inner and outer walls of said liner being spaced from said sleeve and said housing, respectively, said liner also having a radially extending wall spaced from said housing and interconnecting said inner and outer walls at one end to define a combustion chamber;

said liner being spaced from said housing and said sleeve to define a compressed air flow path, said compressed air flow path extending from a radially outer compressed air inlet in communication with a source of compressed air to a radially inner compressed air outlet in communication with said combustion chamber, said compressed air outlet being axially remote from said radially extending wall;

a fuel manifold having a plurality of circumferentially spaced fuel dispensing openings, said fuel manifold being disposed between said housing and said outer wall of said liner and being in communication with a source of liquid fuel, said fuel manifold being disposed in a first plane transverse to said axis;

a plurality of open ended elongated tubes in said outer wall adjacent said fuel manifold, said tubes being disposed in a second plane transverse to said axis in closely spaced parallel relation to said plane of said fuel manifold, said tubes being directed generally tangential to said combustion chamber;

each of said tubes having one end located within said combustion chamber and the other end disposed between said outer wall and said housing, said one end of each of said tubes being disposed closely adjacent said radially extending wall and said other end of each of said tubes being in communication with said compressed air flow path, each of said tubes being in communication with one of said fuel dispensing openings in said fuel manifold to receive fuel therefrom;

said tubes being positioned to impact liquid fuel directly onto an inner surface of said outer wall;

means for centrifuging liquid fuel onto said inner surface of said outer wall including a plurality of open ended elongated tubes in said outer wall intermediate said compressed air inlet and said radially extending wall, said tubes being disposed in a third plane transverse to said axis in spaced apart but parallel relation to said first and second planes, said tubes communicating with said compressed air flow path to direct air for combustion into said combustion chamber in such manner as to cause an at least partially stabilized stratification of an inner cold air layer, a hot flame layer, a gaseous fuel layer and an outer liquid fuel layer; and means for igniting a mixture of fuel and air within said combustion chamber.

9. The annular combustor of claim 8 wherein said tubes intermediate said compressed air inlet and said radially extending wall are directed generally tangential to said combustion chamber, each of said tubes having one end located within said combustion chamber and the other end disposed between said outer wall and said housing, said tubes being directed at generally the same angle as said tubes adjacent said fuel manifold to produce swirl within said combustion chamber.

10. The annular combustor of claim 8 including a plurality of open ended elongated tubes in said outer wall adjacent said compressed air inlet, each of said tubes having one end located within said combustion chamber and the other end disposed between said outer wall and said housing, said tubes being directed toward a combustor outlet at the end of said combustion chamber remote from said radially extending wall to provide dilution air at a point upstream of a turbine nozzle.

11. The annular combustor of claim 8 wherein said compressed air outlet of said compressed air flow path is in communication with said combustion chamber adjacent a turbine shroud, said turbine shroud and said outer wall of said liner together defining a combustor outlet leading to a turbine nozzle, said compressed air outlet directing compressed air from said compressed air flow path onto said turbine shroud upstream of said combustor outlet and turbine nozzle to provide cooling and dilution air.

12. The annular combustor of claim 8 wherein said fuel manifold and said tubes in said outer wall adjacent said fuel manifold are in side-by-side relation, said tubes in said outer wall adjacent said fuel manifold being positioned axially closer to said radially extending wall than said fuel manifold, and including a fuel line extending from a liquid fuel source to said fuel manifold between said housing and said outer wall within said compressed air flow path.

13. An annular combustor for a gas turbine, comprising:

a bell-shaped combustor housing including an axially extending sleeve having an axis;

an annular liner disposed within said housing and about said sleeve and having concentric inner and outer axially elongated walls, said inner and outer walls of said liner being spaced from said sleeve and said housing, respectively, said liner also having a radially extending wall spaced from said housing and interconnecting said inner and outer walls at one end to define a combustion chamber;

said liner being spaced from said housing and said sleeve to define a compressed air flow path, said compressed air flow path extending from a radially outer compressed air inlet in communication with a source of compressed air to a radially inner compressed air outlet in communication with said combustion chamber, said compressed air outlet being axially remote from said radially extending wall;

a fuel manifold having a plurality of circumferentially spaced fuel dispensing openings, said fuel manifold being disposed between said housing and said outer wall of said liner and being in communication with a source of liquid fuel, said fuel manifold being disposed in a first plane transverse to said axis;

a plurality of open ended elongated tubes in said outer wall adjacent said fuel manifold, said tubes being disposed in a second plane transverse to said axis in closely spaced parallel relation to said plane of said fuel manifold, said tubes being directed generally tangential to said combustion chamber;

each of said tubes having one end located within combustion chamber and the other end disposed between said outer wall and said housing, said one end of each of said tubes being disposed closely adjacent said radially extending wall and said other end of each of said tubes being in communication with said compressed air flow path, each of said tubes being in communication with one of said fuel dispensing openings in said fuel manifold to receive fuel therefrom;

said tubes being positioned to impact liquid fuel directly onto an inner surface of said outer wall;

means for centrifuging liquid fuel onto said inner surface of said outer wall including a plurality of open ended elongated tubes in said outer wall intermediate said compressed air inlet and said radially extending wall, said tubes being disposed in a third plane transverse to said axis in spaced apart but parallel relation to said first and second planes, said tubes communicating with said compressed air flow path to direct air for combustion into said combustion chamber;

said tubes intermediate said compressed air inlet and said radially extending wall being directed generally tangential to said combustion chamber, each of said tubes having one end located within said combustion chamber and the other end disposed between said outer wall and said housing, said tubes being directed at generally the same angle as said tubes adjacent said fuel manifold to produce swirl within said combustion chamber in such manner as to cause an at least partially stabilized stratification of an inner cold air layer, a hot flame layer, a gaseous fuel layer and an outer liquid fuel layer;

a plurality of open ended elongated tubes in said outer wall adjacent said compressed air inlet, each of said tubes having one end located within said combustion chamber and the other end disposed between said outer wall and said housing, said tubes being directed toward a combustor outlet at the end of said combustion chamber remote from said radially extending wall to provide dilution air at a point upstream of a turbine nozzle; and means for igniting a mixture of fuel and air within said combustion chamber.

14. The annular combustor of claim 13 wherein said compressed air outlet of said compressed air flow path is in communication with said combustion chamber adjacent a turbine shroud, said turbine shroud and said outer wall of said liner together defining a combustor outlet leading to a turbine nozzle, said compressed air outlet directing compressed air from said compressed air flow path onto said turbine shroud upstream of said combustor outlet and turbine nozzle to provide cooling and dilution air.

15. The annular combustor of claim 13 wherein said fuel manifold and said tubes in said outer wall adjacent said fuel manifold are in side-by-side relation, said tubes in said outer wall adjacent said fuel manifold being positioned axially closer to said radially extending wall than said fuel manifold, and including a fuel line extending from a liquid fuel source to said fuel manifold between said housing and said outer wall within said compressed air flow path.

* * * * *